United States Patent
Yoshihara et al.

[15] 3,671,592
[45] June 20, 1972

[54] MODIFICATION OF ALICYCLIC OR ALIPHATIC DIEPOXY COMPOUNDS

[72] Inventors: Mitsuo Yoshihara, Takatsuki; Kazunori Mizutani, Ibaraki, both of Japan

[73] Assignee: Nitto Electric Industrial Co., Ltd., Ibaraki, Japan

[22] Filed: Nov. 12, 1969

[21] Appl. No.: 876,071

[30] Foreign Application Priority Data

Nov. 12, 1968 Japan.....................................43/82736

[52] U.S. Cl......................260/2 EP, 260/2 EA, 260/78.4 EP, 260/348 A, 260/348 C
[51] Int. Cl...........................................C08g 30/12, C07d 1/00
[58] Field of Search...............260/348 R, 348 C, 2 EP, 75 EP, 260/78.4 EP

[56] References Cited

UNITED STATES PATENTS

| | | | |
|---|---|---|---|
| 2,890,194 | 6/1959 | Phillips et al. | 260/835 |
| 2,890,196 | 6/1959 | Phillips et al. | 260/835 |
| 2,890,197 | 6/1959 | Phillips et al. | 260/835 |
| 2,917,493 | 12/1959 | Phillips et al. | 260/78.4 |
| 2,918,444 | 12/1959 | Phillips et al. | 260/31.2 |
| 2,921,925 | 1/1960 | Phillips et al. | 260/75 |
| 2,921,929 | 1/1960 | Phillips et al. | 260/75 |
| 2,970,983 | 2/1961 | Newey | 260/47 |

*Primary Examiner*—William H. Short
*Assistant Examiner*—E. Nielsen
*Attorney*—Wenderoth, Lind & Ponack

[57] ABSTRACT

This invention relates to a method of modifying alicyclic or aliphatic diepoxy compounds having two epoxy groups in the molecule, and is more particularly directed to the modification of the above mentioned diepoxy compounds which are low in the viscosity at the normal temperature with certain dicarboxylic acid and acid anhydride to increase the viscosity. The resultant materials are excellent electrical insulators and are suitable for compression molding, general molding, laminating and binding.

7 Claims, No Drawings

MODIFICATION OF ALICYCLIC OR ALIPHATIC DIEPOXY COMPOUNDS

Epoxy compounds differ in their properties depending on the number of epoxy groups present in the molecule and on the kind of structural skeleton unit (aromatic, alicyclic or aliphatic hydrocarbon or combination thereof) so that it is necessary to select and to use a particular epoxy compound suitable for the particular use. Generally epoxy compounds having an aromatic skeleton such as, for example, a condensate of 2,2-bis(4-hydroxyphenyl) propane (bisphenol A) and epichlorohydrin are well known in the market under the trade names Epicoat 828, Epicoat 1001 or Epicoat 1004. However, since they contain aromatic rings which are high in carbon content, they are poor in electric characteristics such as arc-resistance and tracking-resistance and therefore are not suitable for electric insulation under high voltage or in a polluted atmosphere.

In order to improve the electric characteristics and mechanical strength, it has been recommended to use an alicyclic or aliphatic epoxy compound containing no carbon-carbon unsaturation or at most one carbon-carbon unsaturation in the molecule. However, most of the commercial alicyclic epoxy compounds having epoxy groups are of low viscosity at normal temperature as will be explained so that, while their mixture with a curing agent is suitable for pouring operations such as casting, potting, encapsulation and sealing, they are not suitable for preparing a pre-mixed or putty type compression molding material or transfer molding material by mixing glass fibers or any other fillers therewith. Further, the cured products are low in mechanical strength. Similarly, epoxy compounds consisting of alicyclic or aliphatic glycidyl ethers and glycidyl esters also have a defect in that, unless measures to increase the viscosity are taken, they will flow out of the mold during compression molding or transfer molding so that no satisfactory moldability is obtained.

We have found that, when 0.01 to 0.6 mol of an alicyclic or aliphatic dicarboxylic acid, as a primary modifier, is reacted with 1 mol of an alicyclic or aliphatic diepoxy compound having two epoxy groups in the molecule to form a linear addition compound having hydroxyl group(s), which is further reacted with 0.01 to 0.6 mol of an alicyclic or aliphatic dicarboxylic acid anhydride as a secondary modifier, there is obtained a modified addition polymer having a viscosity of about 100 to 20,000 poises at 30° C. which is viscous or, though very scarcely, has a low melting point i.e., at the normal temperature. In the above modification process, the total amount of the above mentioned primary and secondary modifiers should be in a range not exceeding 0.9 mol per mol of the diepoxy compound to be modified.

The diepoxy compounds of low viscosity to which the modification of this invention is most effectively applied are alicyclic diepoxy compounds which have two intramolecular epoxy groups bonded to the alicyclic ring and which are commercially known under trade names of Unox—221 (Union Carbide Corp., U.S.A.) and Araldite CY—175 (Ciba, Ltd., Switzerland).

The structure of Unox-221 is:

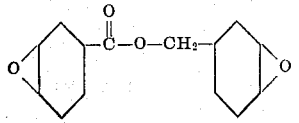

and the structure of Araldite Y-175 is:

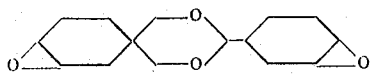

However, other alicyclic diepoxy compounds having intramolecular epoxy groups may also be used. Examples of these compounds are represented by the following structural formulas:

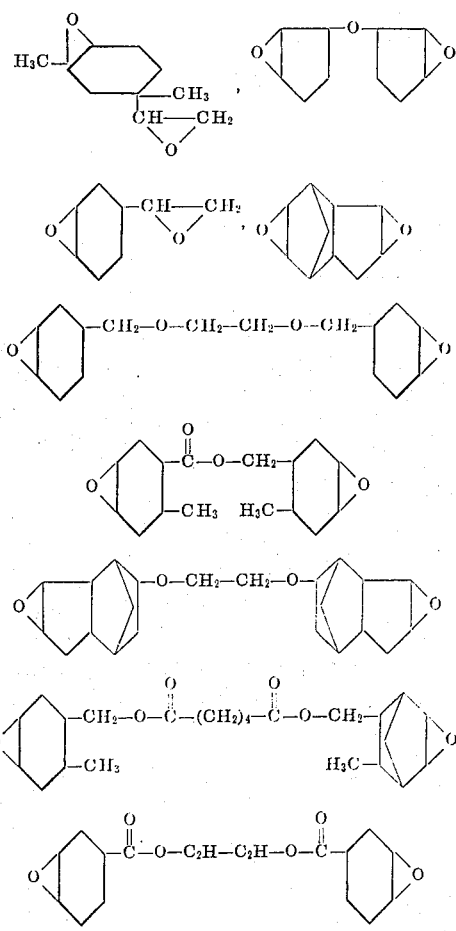

Further, alicyclic or aliphatic diglycidyl ethers or diglycidyl esters having a 1,2-epoxy group at the molecule terminal through an ether or ester linkage may also be used in the present invention. The above mentioned diglycidyl ether is a compound having two glycidyl groups linked through an ether linkage in the molecule and may be obtained by reacting an alicyclic or liphatic diol with an epihalohydrin, for example, in the presence of NaOH or KOH by a known process. The diglycidyl ester is a compound having two glycidyl groups through an ester linkage in the molecule and may be obtained by reacting an alicyclic or aliphatic dicarboxylic acid or its anhydride with an epihalohydrin in the presence, for example, of a quaternary ammonium salt as a catalyst. As these compounds, there can be enumerated, for example, alicyclic diepoxy compounds represented by the following structural formulas:

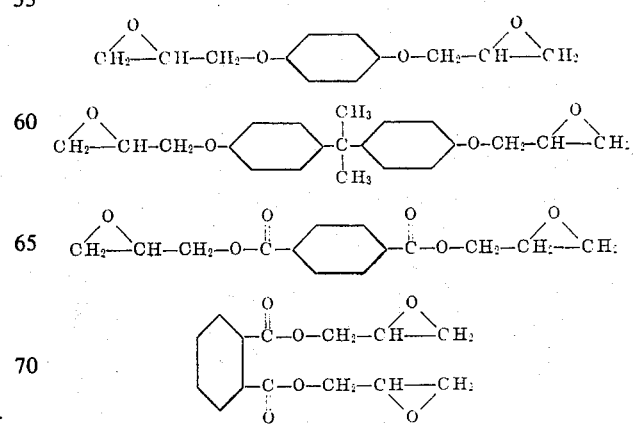

and aliphatic diepoxy compounds represented by the structural formulas

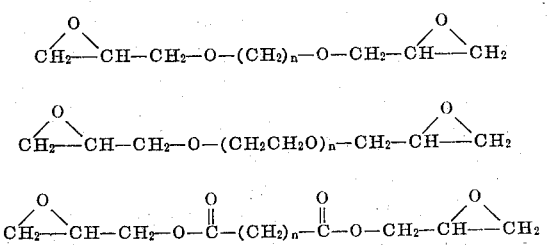

wherein n is an integer of 1 to 300.

Such alicyclic or aliphatic diepoxy compounds to be modified according to the process of this invention are generally liquids of low molecular weight at normal temperatures. However, when modified according to this invention, they are rendered suitable as a compression molding material and which is viscous at normal temperatures or of low melting point.

According to the modification method of the present invention, an alicyclic or aliphatic dicarboxylic acid is used as a primary modifier so that the epoxy groups in the above mentioned diepoxy compound are partly ring-opened to form a linear addition product having one or more alcoholic hydroxyl groups. Then this product is reacted with an anhydride of an alicyclic or aliphatic dicarboxylic acid (secondary modifier) to obtain a stable modified addition polymer which does not gel at normal temperatures.

The above mentioned alicyclic or aliphatic dicarboxylic acids should be those having no carbon-carbon unsaturation or having at most one carbon-carbon unsaturation. Examples of them are alicyclic dicarboxylic acids such as cyclobutane-1,2-dicarboxylic acid, 3,4-dimethylcyclobutane-1,2-dicarboxylic acid, cyclobutane-1,3-dicarboxylic acid, 1,2-cyclopentane dicarboxylic acid, 1-methyl-1,2-cyclopentane dicarboxylic acid, 1,3-cyclopentane dicarboxylic acid, hexahydrophthalic acid, hexahydroisophthalic acid, hexahydroterephthalic acid, their alkyl substitutes such as 4-methylhexahydrophthalate, tetrahydrophthalic acid, tetrahydroisophthalic acid, tetrahydroterephthalic acid and their alkyl substitutes such as 4-methyl-tetrahydrophthalic acid; or such aliphatic dicarboxylic acids as succinic acid, glutaric acid, methyl succinic acid, α-methyl glutaric acid, adipic acid, pimelic acid and sebacic acid.

The secondary modifiers, i.e. alicyclic or aliphatic dicarboxylic acid anhydrides should be those having no carbon-carbon unsaturation or having at most one carbon-carbon unsaturation in the molecule. Examples of these acid anhydrides are such anhydrides of alicyclic or aliphatic dicarboxylic acids as cyclobutane-1,2-dicarboxylic anhydride, 3,4-dimethyl-cyclobutane-1,2-dicarboxylic anhydride, 1,2-cyclopentanedicarboxylic anhydride, 1-methyl-1,2-cyclopentane dicarboxylic anhydride, hexahydrophthalic anhydride, 4-methyl-hexahydrophthalic anhydride, tetrahydrophthalic anhydride, succinic anhydride and Nadic Anhydride (4-endo-methylene tetrahydrophthalic acid anhydride) which is a trade name of an addition compound of maleic anhydride and cyclopentadiene marketed by National Aniline Co., U.S.A. and its methyl substitute, i.e. Methyl Nadic Anhydride.

In carrying out the process of this invention, 0.01 to 0.6 mol of the dicarboxylic acid (primary modifier) is added to 1 mol of the above mentioned diepoxy compound to cause a reaction to form a linear addition product having alcoholic hydroxyl group(s) by the partial ring opening of the epoxy groups. The resulting linear addition compound has a viscosity of about 10 to 1,500 poises at 30° C. When the amount of the first or primary modifier is below 0.01 mol there can not be obtained a satisfactory modifying effect, while if it is higher than 0.6 mol, the viscosity of the linear addition compound will rise so much as to finally demonstrate a fusible solid character the same as that of a thermoplastic resin, so that it will be difficult to obtain a final product suitable for use as a compression molding material.

In order to further adjust the viscosity to improve the characteristics of the cured product, the subsequent second modification is required, according to this invention.

Thus, in the second modification step, 0.01 to 0.6 mol of the dicarboxylic acid anhydride is reacted with the linear addition product having alcoholic hydroxyl group(s) obtained in the first step, to obtain a modified addition polymer which is viscous at the normal temperature or low in the melting point. The modification with such acid anhydride is one of the essential features of the present invention. By changing the kind of the acid anhydride and by controlling the amount thereof relative to the linear addition product, the viscosity of the resulting modified addition polymer can be adjusted, and even a linear addition product of a comparatively short chain can be rendered high in viscosity.

It is known to employ an acid anhydride as a curing agent for cross-linking an epoxy resin. In contrast, in the above mentioned modification, it is deemed that, by the reaction of the alcoholic hydroxyl group(s) of the linear addition product and the acid anhydride, the acid anhydride will be further added to the side chain of the linear addition product and consequently the viscosity will rise. Therefore, by controlling the amount of addition of the acid anhydride, the viscosity of the resulting polymer can be adjusted. When the amount of addition of the acid anhydride is less than 0.01 mol, no practicable viscosity rise will be able to be expected, while when it is more than 0.6 mol, a three-dimensional structure will be formed and undesirable gelling will occur.

As described above, in the present invention, a particular diepoxy compound is modified in two steps. It is necessary to use the above mentioned primary and secondary modifiers in a range, such that their total amount does not exceed 0.9 mol per mol of the diepoxy compound. In case it exceeds 0.9 mol, there will be a danger of gel formation in the modifying reaction and there will be a tendency that the resulting modified addition polymer is unstable in storing.

Further, in the actual operation, there is a possibility of the gel formation due to the reaction heat. Therefore, it is necessary to keep the temperature of the reaction system below 150° C., preferably 50° — 150° C. in both the first and second modification steps.

If desired, the modified addition polymer of the diepoxy compound obtained by the method of the present invention can be used as mixed with any other diepoxy compound or polyepoxy compound. Further, it is also included within the scope of present invention to prepare a curable resin composition containing the above mentioned modified addition polymer or its mixture mentioned above and a curing agent, for example, a polyamine or an hydride of a polycarboxylic acid. Any curing agent known in the art of epoxy resins may be used. The modified addition polymer of the present invention or its mixture with any other epoxy compound can be mixed with usual agents such as a filler, plasticizer, stabilizer, coloring agent and flame-resisting agent. Suitable fillers are such inorganic or organic fibers as glass, asbestos, polyester, vinylon, cellulose and hemp fibers, mica, quartz powder, aluminum hydroxide, kaolin and clay.

The resinous composition thus obtained is useful not only as a compression molding material or transfer molding material for electric uses but also as a general molding material, laminating material or binder.

Examples of the present invention will be given in the following:

EXAMPLE 1

268 g. (1 mol) of Unox—221 (product of Union Carbide Corporation, U.S.A.) and 17.2 g. (0.1 mol) of hexahydrophthalic acid were charged into a three-necked flask (capacity of 1 liter) provided with a thermometer and agitator. The mixture was reacted at 120° to 130° C. for 5 hours while stirring to obtain a linear addition product of an acid value of 0.7 and a viscosity of about 550 poises at 30° C. having alcoholic hydroxyl group. To this linear addition product was further added 30.8 g. (0.2 mol) of hexahydrophthalic anhydride and the mixture was allowed to react as the same temperature as mentioned above for 10 hours, to obtain a very viscous resinous modified addition polymer. The characteristics of this modified resin had an acid value of 0.5, oxirane oxygen of 4.2 percent, viscosity of 12,000 poises at 50° C. Even after storing at 20° C. for 6 months, substantially no change of the characteristics was observed. Since the linear addition product obtained in the primary modifying step was increased in viscosity and was partly cross-linked in the secondary modification step, the resulting polymer mixed with a curing agent, filler or any other mixing agent did not flow out of the metal mold in during the molding operation. The dispersibility of the filler (particularly glass fibers) in the polymer was excellent.

EXAMPLE 2

320 g. (1 mol) of Araldite CY-175 (product of Ciba, Ltd., Switzerland) and 8.6 g. (0.05 mol) of hexahydrophthalic acid were reacted at 90° to 100° C. for 2 hours in the same reaction apparatus as in Example 1, to obtain a linear addition product of an acid value of 0.3 and a viscosity of 800 poises at 30° C. Then 15.4 g. (0.1 mol) of hexahydrophthalic anhydride was added thereto and the reaction was further continued for 5 hours while maintaining the reaction temperature at 110° to 115° C., to obtain a modified resin with a melting point of 101° to 105° C. This modified resin was suitable for high pressure molding. Its acid value was 1.2. The oxirane oxygen content was 4.6 percent. Even after it was stored at 20° C. for 6 months, no change of its characteristics was observed.

EXAMPLE 3

When 228 g. (1 mol) of 1,4-cyclohexanediol diglycidyl ether and 7.3 g. (0.05 mol) of adipic acid were reacted together at 70° to 80° C. for 2 hours in the same reaction apparatus as in Example 1, the acid value became 0.8 and the viscosity of the reaction system was increased. Then 5 g. (0.05 mol) of succinic anhydride was added thereto and the reaction was continued for 2 hours while maintaining the temperature at 90° to 100° C. There was obtained a modified resin of an acid value of 0.4, 11.5 percent oxirane oxygen and viscosity of 200 poises at 30° C. The storage stability was as high as the product obtained in Example 1.

EXAMPLE 4

When 352 g. (1 mol) of hydrogenated bisphenol A glycidyl ether represented by the structural formula

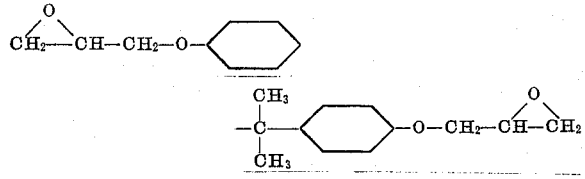

and 1.72 g. (0.01 mol) of hexahydroisophthalic acid were reacted at 120 ± 2° C. for 1 hour in the same reaction apparatus as in Example 1, the acid value became 1.2 and the viscosity of the reaction system increased. Then 15.4 g. (0.1 mol) of hexahydrophthalic anhydride was added thereto and the reaction was continued for 3 hours while maintaining the temperature at 125° to 130° C. There was obtained a modified resin of an acid value of 0.6, 7.0 percent oxirane oxygen and viscosity of 900 poises at 30° C.

EXAMPLE 5

When 202 g. (1 mol) of 1,4-butanediol diglycidyl ether and 59 g. (0.5 mol) of succinic acid were reacted at 60° to 70° C. for 5 hours in the same reaction apparatus as in Example 1, the acid value became 0.7 and the viscosity of the reaction system increased. Then 15.4 g. (0.1 mol) of hexahydrophthalic anhydride was added thereto and the reaction was continued for 7 hours while maintaining the reaction temperature at 80° to 90° C. There was obtained a modified resin of an acid value of 0.9, 4.5 percent oxirane oxygen and viscosity of 760 poises at 30° C.

EXAMPLE 6

When 218 g. (1 mol) of diethylene glycol diglycidyl ether and 86 g. (0.5 mol) of hexahydroterephthalic acid were reacted at 90° to 100° C. for 7 hours in the same reaction apparatus as in Example 1, the acid value became 0.9 and the viscosity of the reaction system increased. Then 71.2 g. (0.4 mol) of Methyl Nadic Anhydride was added thereto and the reaction was continued for 8 hours while maintaining the temperature at 120° to 130° C. There was obtained a modified resin of an acid value of 1.4, 2.2 percent oxirane oxygen and viscosity of 15,000 poises at 30° C.

EXAMPLE 7

When 258 g. (1 mol) of adipic acid diglycidyl ester and 17.2 g. (0.1 mol) of hexahydroterephthalic acid were reacted at 130 ± 2° C. for 1 hour in the same reaction apparatus as in Example 1, the acid value became 1.0 and the viscosity of the reaction system increased. Then 30.8 g. (0.2 mol) of hexahydrophthalic anhydride was added thereto and the reaction was continued for 5 hours while maintaining the temperature at 100 ± 2° C. There was obtained a modified resin of 5.2 percent oxirane oxygen and a viscosity of 500 poises at 30° C.

EXAMPLE 8

When 284 g. (1.0 mol) of hexahydroterephthalic acid diglycidyl ester and 14.6 g. (0.1 mol) of adipic acid were reacted at 120 ± 2° C. for 3 hours in the same reaction apparatus as in Example 1, the acid value became 0.5 and the viscosity of the reaction system increased. Then 50 g. (0.5 mol) of succinic anhydride was added thereto and the reaction was further continued for 2 hours while maintaining the temperature at 120° to 130° C. There was obtained a modified resin of an acid value of 0.7, 6.0 percent oxirane oxygen and viscosity of 8,000 poises at 40° C.

The storage stability of the modified resin obtained in each of the above Examples 4 to 8 was high so that, even after the resin was stored at 20° C. for 6 months, substantially no change in characteristics was observed.

What we claim is:

1. A method of modifying a low viscosity alicyclic or aliphatic diepoxy compound having two oxirane epoxy groups in the molecule which comprises reacting 0.01 — 0.6 mol of an alicyclic or aliphatic dicarboxylic acid as a primary modifier with 1 mol of the diepoxy compound to form a linear addition product having hydroxyl group(s) and then reacting 0.01 to 0.6 mol of an alicyclic or aliphatic dicarboxylic acid anhydride as a secondary modifier with the above mentioned linear addition product to increase the viscosity, the total amount of said primary and secondary modifiers not exceeding 0.9 mol per mol of said diepoxy compound, the reactions with the primary and secondary modifiers being conducted at 50° to 150° C.

2. A method as claimed in claim 1 wherein the diepoxy compound has no carbon-carbon unsaturation or has at most one carbon-carbon unsaturation in the molecule.

3. A method as claimed in claim 1 wherein each of the primary and secondary modifiers has no carbon-carbon unsaturation or has at most one carbon-carbon unsaturation in the molecule.

4. A method as claimed in claim 1 wherein the epoxy compound is selected from the group consisting of alicyclic diepoxy compounds having two oxirane epoxy groups connected to the alicyclic ring, and alicyclic or aliphatic diglycidyl ethers or esters having 1,2-epoxy group at each molecule terminal through an ether or ester linkage.

5. A method as claimed in claim 1 wherein the primary modifier is selected from alicyclic dicarboxylic acids such as cyclobutane-1,2-dicarboxylic acid, 3,4-dimethylcyclobutane-1,2-dicarboxylic acid, cyclobutane-1,3-dicarboxylic acid, 1,2-cyclopentane dicarboxylic acid, 1-methyl-1,2-cyclopentane dicarboxylic acid, 1,3-cyclopentane dicarboxylic acid, hexahydrophthalic acid, hexahydroisophthalic acid, hexahydroterephthalic acid, their alkyl substitutes such as 4-methyl-hexahydrophthalate, tetrahydrophthalic acid, tetrahydroisophthalic acid, tetrahydroterephthalic acid and their alkyl substitutes such as 4-methyl-tetrahydrophthalic acid; or such aliphatic dicarboxylic acids as succinic acid, glutaric acid, methyl succinic acid, α-methyl glutaric acid, adipic acid, pimelic acid and sebacic acid.

6. A method as claimed in claim 1 wherein the secondary modifiers is selected from anhydrides of alicyclic or aliphatic dicarboxylic acids as cyclobutane-1,2-dicarboxylic anhydride, 3,4-dimethylcyclobutane–dicarboxylic anhydride, 1,2-cyclopentanedicarboxylic anhydride, 1-methyl-1,2-cyclopentane dicarboxylic anhydride, hexahydrophthalic anhydride, 4-methylhexahydrophthalic anhydride, tetrahydrophthalic anhydride, succinic anhydride and 4-endomethylene tetrahydrophthalic acid anhydride and its methyl derivative.

7. The product of the process of claim 1.

* * * * *